(12) United States Patent
Ofek et al.

(10) Patent No.: US 7,946,921 B2
(45) Date of Patent: May 24, 2011

(54) CAMERA BASED ORIENTATION FOR MOBILE DEVICES

(75) Inventors: Eyal Ofek, Shun Yi District (CN); Feng-Hsiung Hsu, Cupertino, CA (US)

(73) Assignee: Microsoft Corproation, Redmond, WA (US)

( * ) Notice: Subject to any disclaimer, the term of this patent is extended or adjusted under 35 U.S.C. 154(b) by 1414 days.

(21) Appl. No.: 11/134,950

(22) Filed: May 23, 2005

(65) Prior Publication Data

US 2006/0287083 A1 Dec. 21, 2006

(51) Int. Cl.
*A63F 13/00* (2006.01)
(52) U.S. Cl. .................. 463/37; 463/30; 463/31; 463/33
(58) Field of Classification Search .................... 463/47, 463/30, 8, 43, 35, 31, 33, 37
See application file for complete search history.

(56) References Cited

U.S. PATENT DOCUMENTS

| | | | | |
|---|---|---|---|---|
| 6,148,149 | A | 11/2000 | Kagle | 396/50 |
| 7,025,675 | B2 * | 4/2006 | Fogel et al. | 463/9 |
| 7,435,177 | B1 * | 10/2008 | Ford | 463/30 |
| 2002/0149613 | A1 | 10/2002 | Gutta et al. | 345/728 |
| 2003/0220145 | A1 * | 11/2003 | Erickson et al. | 463/47 |
| 2004/0012566 | A1 * | 1/2004 | Bradski | 345/158 |
| 2004/0196265 | A1 * | 10/2004 | Nohr | 345/169 |
| 2004/0196400 | A1 * | 10/2004 | Stavely et al. | 348/333.01 |
| 2005/0104857 | A1 * | 5/2005 | Jacobs et al. | 345/169 |

OTHER PUBLICATIONS

Bartlett, J.F., "Rock "n" Scroll is Here to Stay", *IEEE Computer Graphics and Applications*, 2000, 1-7.
Hinckley, K. et al., "Sensing Techniques for Mobile Interaction", *ACM UIST, Symposium on User Interface Software and Technology, CHI Letters*, 2000, 2(2), 91-100.
Hinckley, K. et al., "Toward More Sensitive Mobile Phones", *ACM*, 2001, 191-192.
Hinckley, K. et al., "The VideoMouse: A Camera-Based Multi-Degree-of-Freedom Input Device", *UIST*, 1999, 103-112.
Rekimoto, J., "Tilting Operations for Small Screen Interfaces (Tech Note)", *Sony Computer Science Laboratory, Inc.*, 2 pages.

* cited by examiner

*Primary Examiner* — Dmitry Suhol
*Assistant Examiner* — Brandon Gray
(74) *Attorney, Agent, or Firm* — Woodcock Washburn LLP

(57) ABSTRACT

In an exemplary embodiment, an on-board camera is used as a controller for a hand-held game device. Control information is provided to a game application via video captured by the camera. As the hand-held device is moved, features of the captured video are tracked. The relative motion between the tracked features and the hand-held device is translated into control information for the game application. Aspects of the game application are rendered on a display of the hand-held game device in accordance with the control information. For example, from a third person perspective, viewing a game character from overhead, rotation of the hand-held game device can be translated into rotation of the character. From a first person perspective, seeing the game through the eyes of the game character, rotation of the hand-held game device can be translated into observing various challenges coming from different directions.

20 Claims, 6 Drawing Sheets

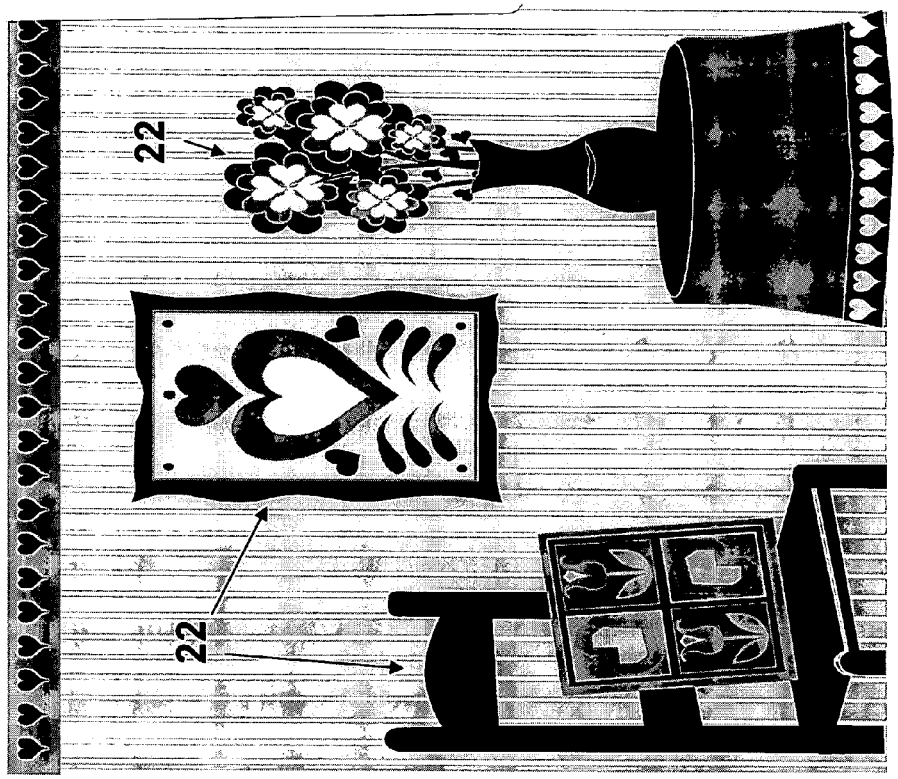
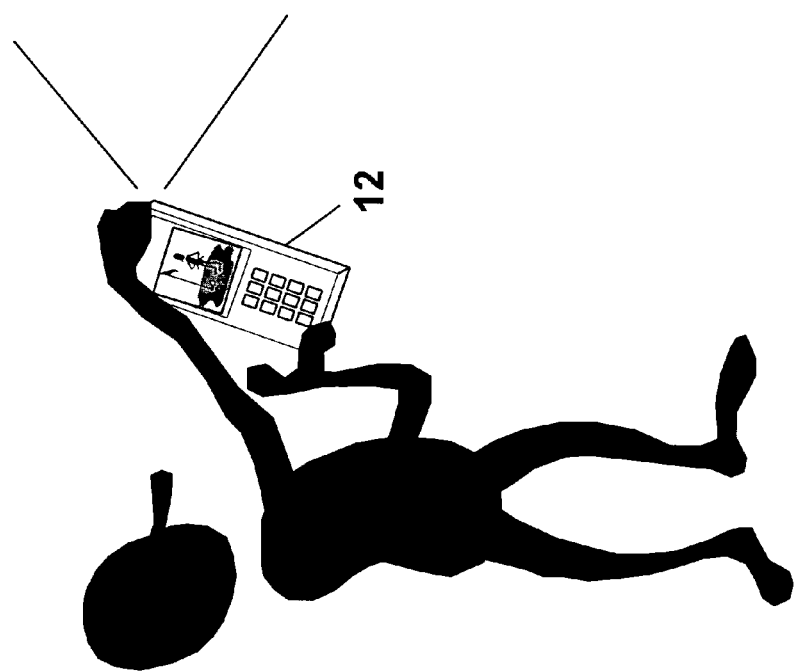
FIGURE 2

CAMERA BASED ORIENTATION FOR MOBILE DEVICES

FIELD OF THE INVENTION

The present invention relates generally to electronics and more specifically to mobile electronics. The invention relates particularly to controlling hand-held systems via sensed inputs from an optical sensor such as a camera.

BACKGROUND OF THE INVENTION

Mobile gaming is gaining popularity. This is due in part to the increasing capabilities of mobile gaming devices. This also is due to the ready availability of mobile devices. Mobile devices include personnel digital assistants (PDAs), cell phones, mobile phones, smart phones, laptop computers, notebook computers, tablet personal computers, and hand-held games, for example. One of the attractive features of mobile devices is small size. However this attractive feature also presents disadvantages.

The small display size limits the amount of detail that can be rendered. If the mobile device is a mobile game console, the user's game experience is thus limited. Further, a small touch-screen display may require a stylus. Use of a stylus can be limited by the size of the display. Also, use of a stylus can be awkward in conjunction with other control inputs such as a keyboard, thumbwheel, and/or buttons.

The number and sophistication of input controls typically is limited. The small form factor of the mobile device restricts the number of control devices. Keyboard sizes typically are reduced and key selection is minimized. For example, games implemented on a desktop personal computer (PC) tend to utilize several types of inputs for controlling applications (e.g., game programs), such as a mouse (positional controller), joystick control, and multiple keyboard keys. Whereas hand-held game consoles do not enjoy this elaborate array of control inputs. In the case of hand-held mobile devices, such as a hand-held game or a smart phone, the need to hold the device in hand limits the range of interaction.

There is a desire to provide control to applications running on mobile devices while overcoming the above disadvantages.

SUMMARY OF THE INVENTION

A system in accordance with an exemplary embodiment of the present invention utilizes an on-board camera as a controller for a hand-held device. Control information is provided to an application, such as a game application, on the hand-held device via video captured by the camera. The video is processed to determine relative motion of the hand-held device. Specific features sensed by the camera are tracked. As the hand-held device is moved, the relative motion between the hand-held device and the sensed features is determined. By analyzing the video captured by the camera, the relative motion of the hand-held device is determined. The motion of the tracked features is translated into application control information. The motion is translated into control information for controlling aspects of the game, dependent upon the game scenario. For example, rotation of the hand-held device can be translated into rotation of a character in the game, translated into changing the point of view of a first or third person game, or translated into scrolling information for scrolling on a large map of a strategy game. The application control information can be in the form of adjunct control information, or can be a proxy for existing control devices, such as a joystick, or a mouse, for example.

BRIEF DESCRIPTION OF THE DRAWINGS

The foregoing and other objects, aspects and advantages will be better understood from the following detailed description with reference to the drawings, in which:

FIG. 2 is an illustration of a user utilizing a mobile device showing examples of features to be optically sensed in accordance with an exemplary embodiment of the present invention;

DETAILED DESCRIPTION OF ILLUSTRATIVE EMBODIMENTS

Figure 1:
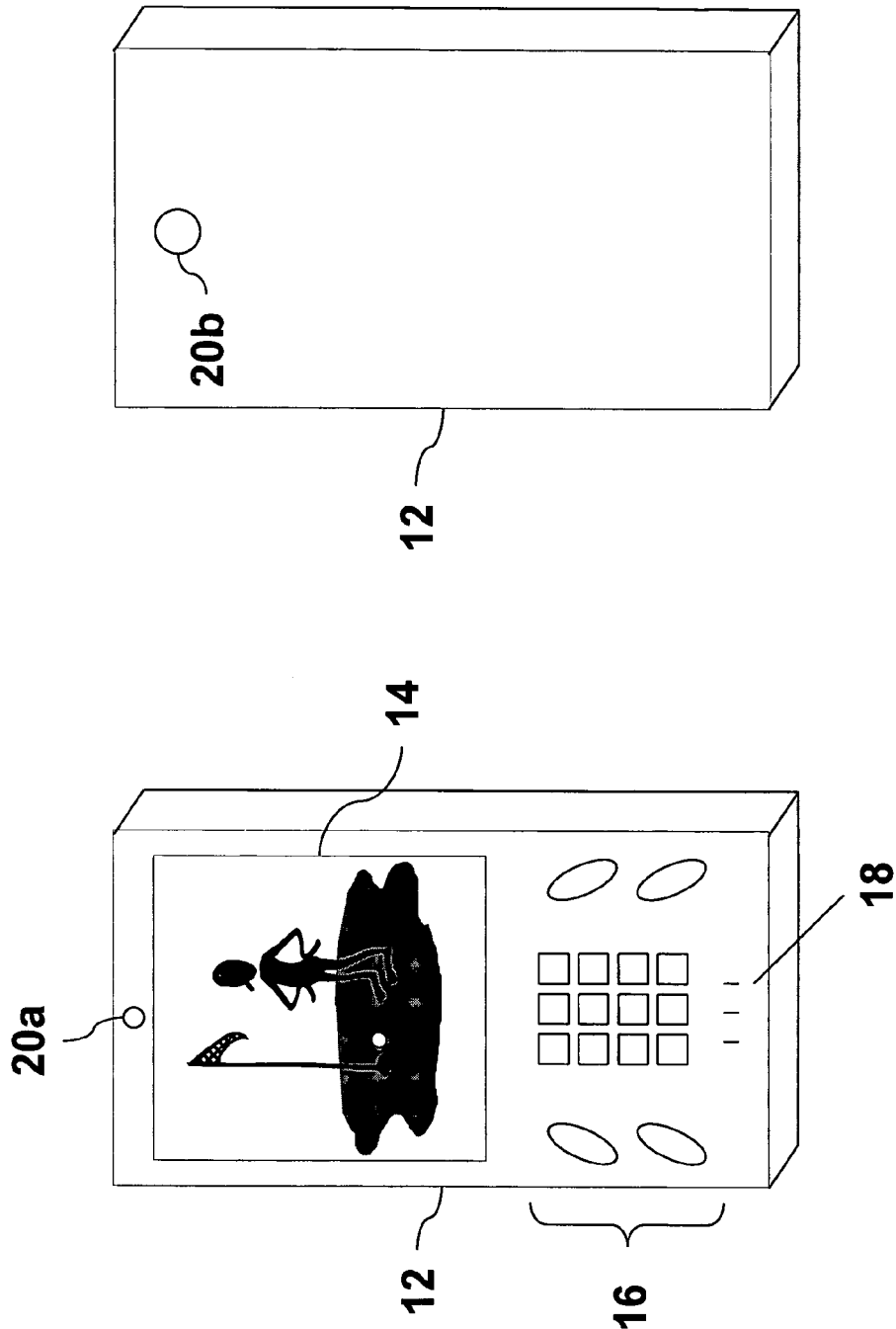
FIG. 1A is an illustration of a front view of mobile device in accordance with an exemplary embodiment of the present invention.
FIG. 1B is an illustration of a rear view of the mobile device depicted in FIG. 1A in accordance with an exemplary embodiment of the present invention.

FIG. 1A is a front view of a mobile device 12 comprising a display portion 14, control portion 16, and a microphone/speaker 18, in accordance with an exemplary embodiment of the present invention. The mobile device 12, as shown in FIG. 1, is a hand-held game console. It is to be understood, however, that mobile device 12 is an exemplary depiction of a mobile device. Mobile device 12 can comprise any appropriate mobile device such as a personnel digital assistant (PDA), a cell phone, a mobile phone, a smart phone, a laptop computer, a notebook computer, a tablet personal computer, a hand-held game, or a combination thereof, for example.

The mobile device 12 comprises a display portion 14 for rendering visual aspects of an application. It is envisioned that applications are executed in a processor within the game device 12. However, applications can be executed remotely and communicated to the mobile device 12. For example, an application can be executed on a server or processor and transmitted to the mobile device 12 via the Internet, a hard wire communication means, a wireless communications means, or a combination thereof.

Aspects of any appropriate applications can be rendered. Appropriate applications include a game, a spreadsheet, a word processing application, a map, a photo album application, or a combination thereof, for example. The application depicted in FIG. 1 is a golf game. The display 14 shown rendered therein is a golfer standing on a green. Example aspects of the rendered display controllable by the mobile device 12 include rotating the golfer to face other portions of the golf course, zooming in or zooming out, panning to the left or right to view other portions of the golf course, or a combination thereof.

The mobile device 12 comprises a control portion 16. The control portion 16 includes buttons and a keypad for controlling the game application (e.g., the golf game). The control portion 16 can comprise any appropriate control such as a joystick, a mouse, a track ball, a thumbwheel, or a combination thereof, for example. The mobile device 12 also comprised a microphone/speaker 18. The microphone/speaker 18 provides the ability to speak into the mobile device 12 and/or to receive audio from the mobile device 12. The microphone/speaker 18 is particularly advantageous in an embodiment wherein the mobile device 12 comprises a phone. It is to be understood that the control and microphone/speaker configuration shown in FIG. 1 are exemplary, and that various other configurations are envisioned. For example, a microphone and speaker can be located at separate locations on the mobile device 12.

FIG. 1B is a rear view of the mobile device 12 showing an optical sensor 20*b*, in accordance with an exemplary embodiment of the present invention. The mobile device 12 comprises an optical sensor 20*a* (shown in FIG. 1A), an optical sensor 20*b* (shown in FIG. 1B), or a combination thereof. The optical sensors 20*a* and 20*b* are collectively referred to as the optical sensor 20, herein. The optical sensor 20 can comprise any combination and/or configuration of optical sensors. For example, the optical sensor 20 can be located on the front (20*a*), back (20*b*), or both sides of the mobile device 12. In another exemplary embodiment, the sensor 20 is capable of being repositioned to any appropriate location on the mobile device 12. The optical sensor 20*a*, facing the front of the mobile device 12, can optically sense objects in front of the mobile device 12. The optical sensor 20*b*, facing the back of the mobile device 12, can optically sense objects behind the mobile device 12. In an exemplary embodiment, one of the optical sensors (either 20*a* or 20*b*) senses objects and the approximate location where the other optical sensor would be comprises a display for rendering what the optical sensor is sensing. For example, if the mobile device 12 were a cellular phone, optical sensor 20*a* would comprise a camera for sensing objects behind the mobile device 12, and the a display (located at 20*a*) would render the image/video captured by optical sensor 20*b*. In another exemplary embodiment, the optical sensor 20*b* optically senses objects behind the mobile device 12, and the captured image/video is rendered via the display 14. The optical sensor 20 can comprise any appropriate optical sensor such as a camera or infrared detection device, for example. In an exemplary embodiment, the optical sensor 12 comprises a camera capable of capturing video. In another exemplary embodiment, a wide angle lens is attached to the sensor 20 to enlarge the viewing angle. A larger viewing angle can facilitate analysis of captured video and facilitate translation of relative motion to control information. A larger viewing angle can provide a more robust translation of relative motion to control information.

FIG. 2 is an illustration of a user operating the mobile device 12, wherein the optical sensor 20*b* is sensing objects 22 behind the mobile device 12, in accordance with an exemplary embodiment of the present invention. The scenario depicted in FIG. 2, is a user in a room of a house, such as a living room for example, playing the golf game on the mobile device 12. The optical sensor 20*b* (optical sensor 20*b* not shown in FIG. 2) senses the objects 22 in the room. The objects 22 include a picture, a chair, and a vase with flowers. The objects 22 are merely examples of objects that can be sensed by the optical sensor 20*b*. The objects 22 can comprise natural or enhanced objects. For example, the objects 22 can comprise outdoor objects, outdoor scenes, indoor scenes, natural objects, augmented objects or a combination thereof. Although the objects 22 can comprise calibration targets, or easily identifiable or tracked objects (e.g., tags or light emitting devices), this is not necessary. The objects 22 need not comprise augmented or artificial objects. The objects 22 can comprise natural objects and/or uncontrolled objects.

A feature, or point of interest, can comprise any appropriate object, portions of an object, multiple objects, or a combination thereof. For example, features can include corners of the picture, the complete picture, the complete chair, the back of the chair, the seat of the chair, a leg of the chair, an individual flower, a subset of flowers, all flowers, the vase, the vase and flowers, the table under the vase, or a combination thereof. Feature(s) are tracked and the relative motion between the mobile device 12 and/or optical sensor 20 and the feature(s) is translated into control information for controlling aspects of the application.

In accordance with an exemplary embodiment of the present invention, no features are needed to recover the transformation between consecutive frames. This is accomplished by using a direct method that minimizes the differences between frames under transformation. An example of such a technique is the hierarchical motion estimation framework proposed by Bergen et al. [J. R. Bergen, P. Anandan, K. J. Hanna, and R. Hingorani, "Hierarchical model-based motion estimation," in *Proc. of 2nd European Conf. on Computer Vision*, 1992, pp. 237-252.].

Figure 3:
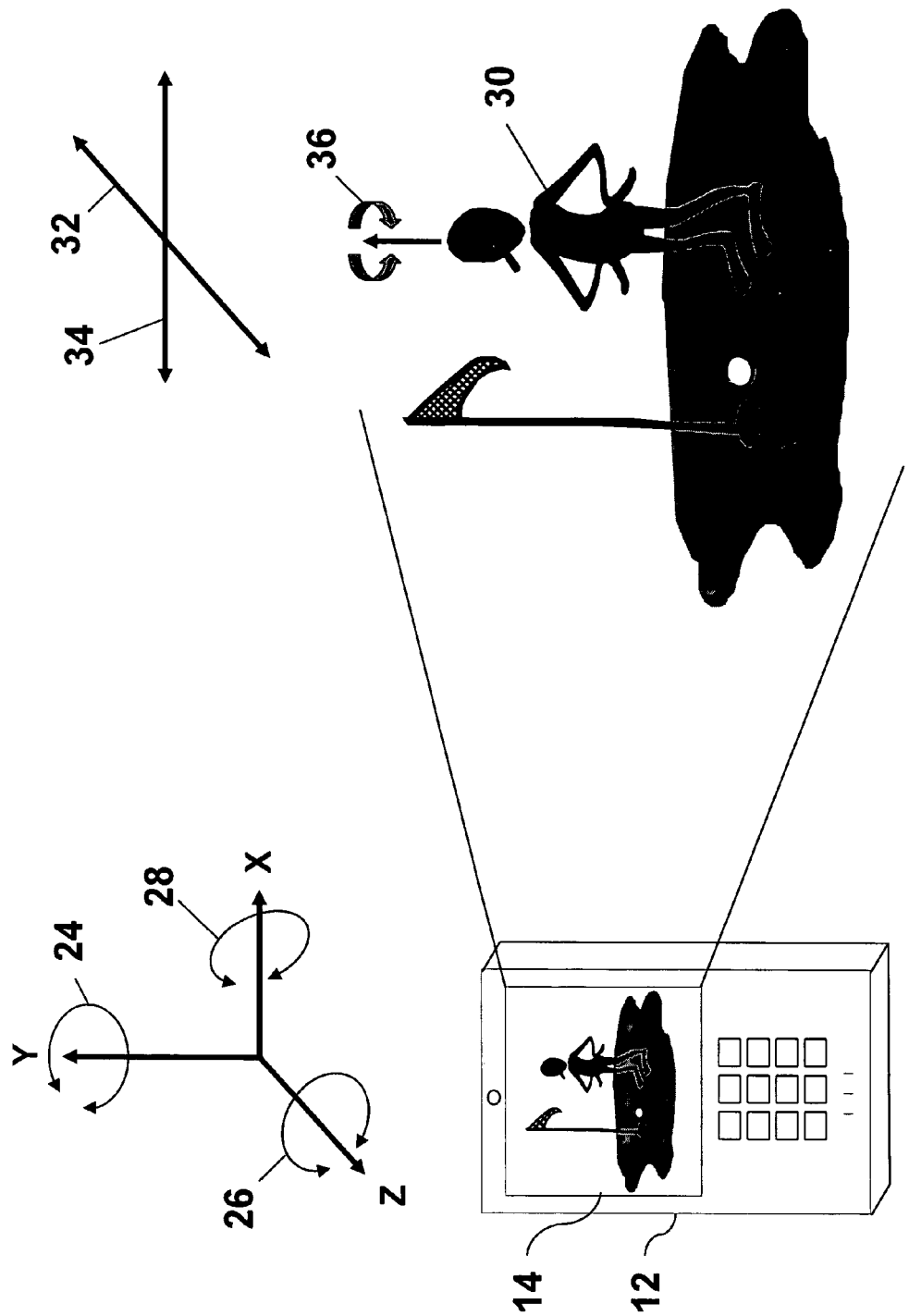
FIG. 3 is a diagram illustrating translated relative motion in accordance with an exemplary embodiment of the present invention.

FIG. 3 is an illustration of motion of the mobile device 12 being translated into application control in accordance with an exemplary embodiment of the present invention. As the mobile device 12 is moved, optically sensed features are tracked by the mobile device 12 and the relative motion of the features is used to control the application. The mobile device 12 can be rotated about the x, y, and z axes as indicated by arrows 28, 24, and 26 respectively. Rotation about the x-axis (arrow 28) is accomplished by tilting the mobile device 12 forward or backward. Rotation about the y-axis (arrow 24) is accomplished by rotating the mobile device 12 around a vertical axis. Rotation about the z-axis (arrow 26) is accomplished by tilting the mobile device to the left or to the right. As the mobile device 12 is tilted and/or rotated, the object features of the video captured by the optical sensor 20 (e.g., features 22 of FIG. 2) will appear to move. This relative motion between the mobile device 12 and optically sensed features is translated into control information for the application. For example, tilting the mobile device 12 forward or backward (arrow 28) can be translated into controlling the character 30 to walk toward or away from the user, as indicated by arrow 32. Rotating the mobile device 12 about a vertical axis (arrow 24) can be translated into controlling the character to spin to the left or to the right, as indicated by arrows 36. Controlling aspects of the character 30 is exemplary.

It is to be understood that other aspects of a rendered display can be controlled. For example, tilting the mobile device forward or backward (arrow 28) can be translated into zooming away from or toward the golf course. In another example, tilting the mobile device 12 to the left or right (arrow 26) can be translated into controlling the golf application to switch to various holes on the golf course. In yet another example, tilting and/or rotating the mobile device 12 can be translated into changed a perspective of the game, such as from a first person perspective to a third person perspective. Other examples of application control include moving a cursor in a spreadsheet, zooming in or out of a map, or navigating through a maze. Thus, motion of the mobile device 12 can be translated into any appropriate application control information.

Translated control information can be provided in various ways. For example, translated control information can be provided as adjunct control information, proxy control information, or a combination thereof. Adjunct control information is provided in addition to other control information provided to an application. Thus, if an application is capable of receiving control information via a thumbwheel and depression switches, adjunct translated control information can be in addition to the thumbwheel and depression switch control information.

Translated control information also can be provided as a proxy to other control information. Using the above example again, if an application is capable of receiving control information via a thumbwheel and depression switches, translated control information can be provided in lieu of (as a proxy for) the thumbwheel or at least one of the depression switches. Thus the translated control information takes the place of other control information.

Format of the translated control information is compatible with the application. Format of the translated control information can be any appropriate format, such as a unique format, a format compatible with other control information, or a combination thereof, for example. In an exemplary embodiment of the present invention, translated control information is provided in a format that is compatible with an existing format, such as a mouse, joystick, or thumbwheel, example.

In an exemplary embodiment of the present invention, relative motion of the optically sensed features is tracked to mitigate erroneous motion. For example, a user moving the mobile device 12 may use jittery or jerking motions. Rather than have the jittery motion translated to application control information, a tracker is utilized to smooth the motion. This provides a more pleasing display. The tracker can track more than one feature concurrently. Also, the tracker can smoothly transition between tracked features. Thus if one feature is lost, another feature's relative motion can be used. Further, a tracker provides a smooth transition when acquiring new features. Any appropriate tracker can by utilized. An example of an appropriate tracker is the KLT (Kanade-Lucas-Tomasi) tracker.

Figure 4:
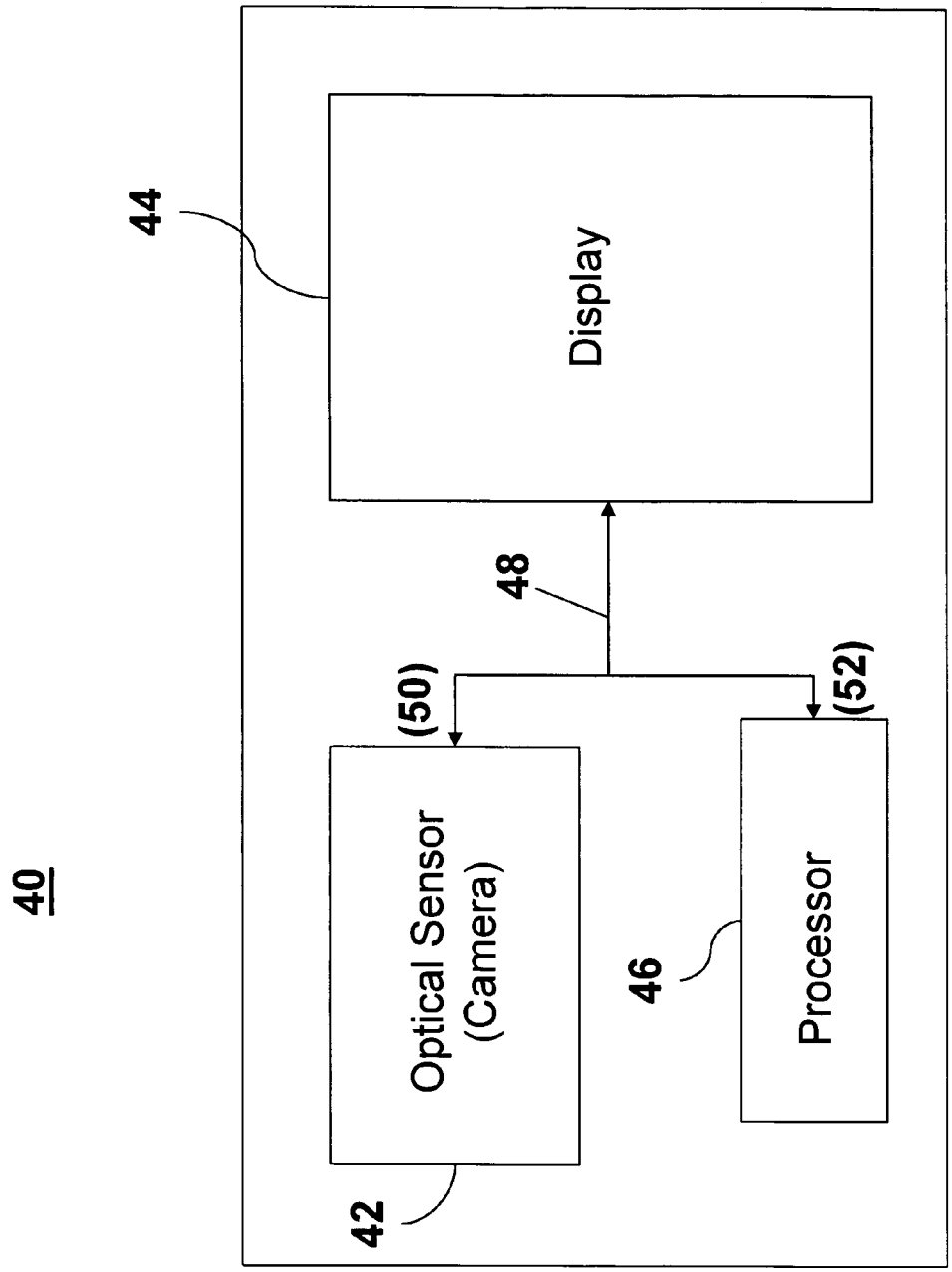
FIG. 4 is a block diagram of a system for providing control information to an application in accordance with an exemplary embodiment of the present invention.

FIG. 4 is a block diagram of a system 40 comprising an optical sensor 42, a display portion 44, a processor 46, and a system bus 48 for providing control information to an application in accordance with an exemplary embodiment of the present invention. The optical sensor 42 is coupled to the display portion 44 and the processor 46 via the system bus 48. The system bus 48 is exemplary. Coupling between the optical sensor 42, the display portion 44, and the processor 46 can be accomplished by any appropriate coupling means, such as a communications bus, hard-wired connections, wireless communications means, optical communications, radio frequency (RF) communication means, or a combination thereof, for example.

The optical sensor 42 comprises any appropriate optical sensor, such as a camera, an infrared detector, or a combination thereof, for example. The optical sensor 42 is capable of capturing still video, moving video, or a combination thereof. The optical sensor 42 senses at least one feature and provides an optical sense signal 50 indicative of the feature (or features) to the processor 46 via the system bus 48.

The processor 46 receives the optical sense signal 50 from the optical sensor 42 via the system bus 48. The processor 46 processes the optical sense signal 50 to determine the relative motion between the optical sensor 42 (or the mobile device in which the optical sensor 42 is installed) and the optically sensed feature (or features). The processor 46 translates the determined relative motion into application control information. The translated application control information is applied to the application by the processor 46. If application of the translated control information results in aspects of the application to be rendered by the display portion 44, the processor 46 provides a display signal 52 indicative of the aspect (or aspects) of the application for rendering by the display portion 44.

In an exemplary embodiment of the present invention, the processor 46 tracks at least one of the optically sensed features. As described above, any appropriate tracker can be utilized, such as the KLT tracker, for example.

In an exemplary embodiment of the present invention, the processor 44 receives control information from other types of control inputs such as a joystick, a mouse, a thumbwheel, a switch (e.g., depression switch), a keyboard, voice, biometrics, or a combination thereof for example (Other control inputs not shown in FIG. 4).

The display portion 44 receives the display signal 52. The display portion 44 processes the display signal 52 and renders an aspect (of aspects) of the application. The display portion 44 can comprise any appropriate display device, such as a liquid crystal display (LCD), a light emitting diode (LED) display, a plasma display, a cathode ray tube (CRT) display, or a combination thereof, for example.

Figure 5:
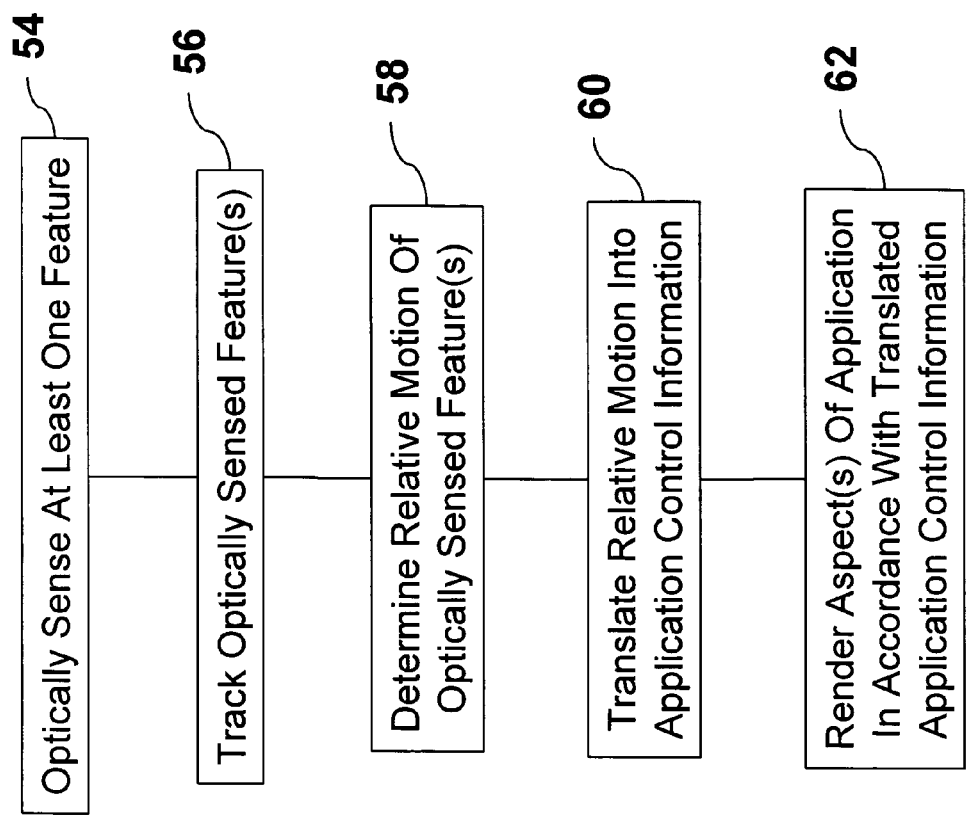
FIG. 5 is a flow diagram of a process for providing control information to an application in accordance with an exemplary embodiment of the present invention.

FIG. 5 is a flow diagram of a process for providing control information to an application in accordance with an exemplary embodiment of the present invention. The feature, or features, is optically sensed by the optical sensor at step 54. At step 56 the optically sensed features are tracked. As described above, tracking is performed for smoothing and to achieve graceful transitions. The relative motion of the optically sensed features is determined at step 58. The relative motion is between the optically sensed features and the optical sensor or the mobile device on which the optical sensor is attached. If the optical sensor is rigidly attached to the mobile device then there is no difference between the relative motion between the optically sensed features and the mobile device and the optically sensed features and the optical sensor. The relative motion is translated into application control information at step 60. At step 62, aspects of the application to be rendered are rendered in accordance with the translated application control information via a display device.

In an exemplary embodiment of the present invention, aspects of the application are rendered audibly, via microphone/speaker 18 for example, in accordance with the translated application control information. For example, in the golf game scenario depicted in FIG. 1 and FIG. 2, if the mobile device is rotated causing the character 30 to walk into the golf flag, the word "ouch" or other appropriate sound can be rendered via the microphone/speaker 18.

Figure 6:
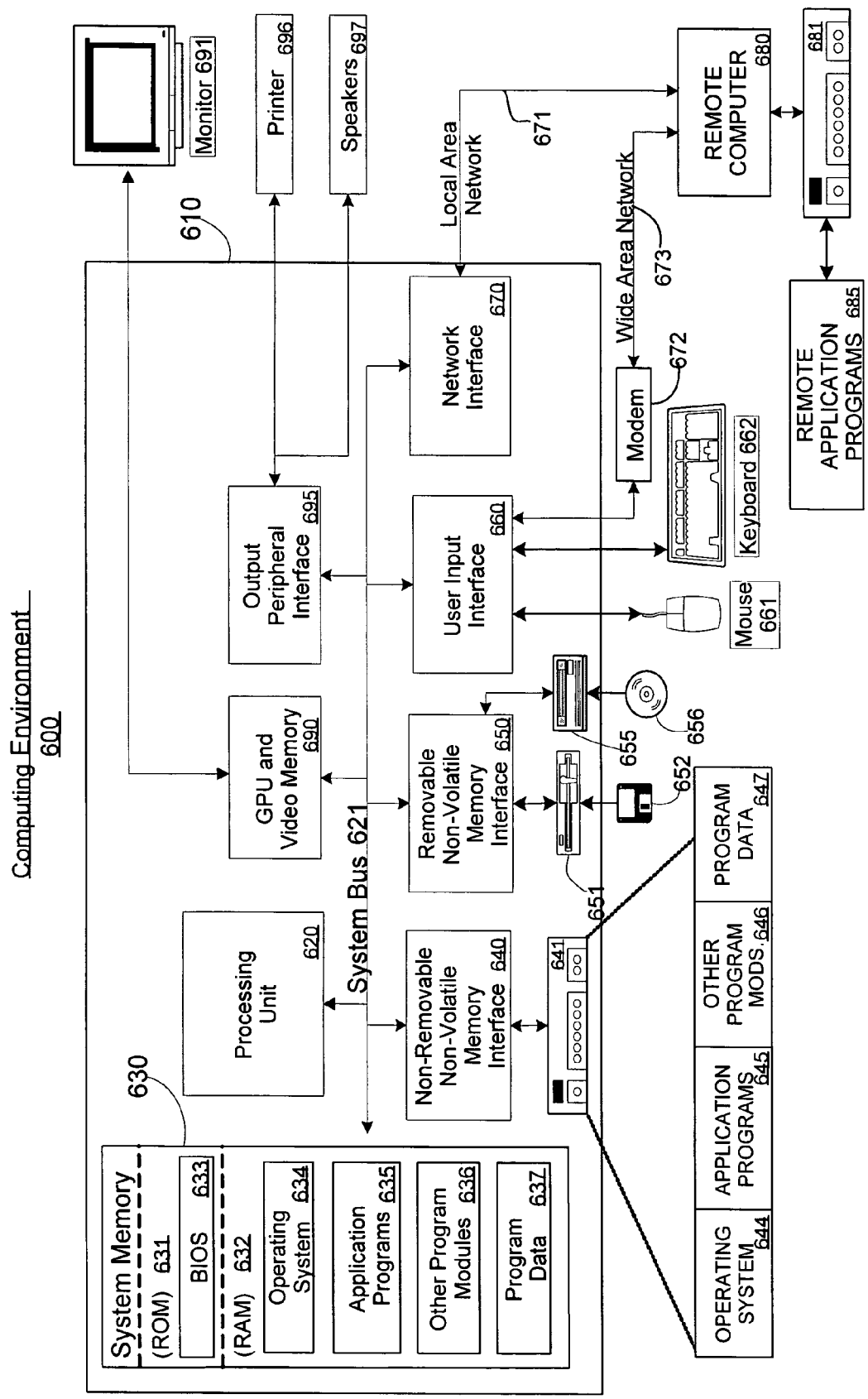
FIG. 6 illustrates an example of a suitable computing system environment in which an exemplary embodiment of the present invention can be implemented.

With reference to FIG. 6, an exemplary system for implementing the present invention includes a general purpose computing device in the form of a computer 610. In an exemplary embodiment of the present invention, the computer 610 comprises a mobile device. Components of computer 610 can include, but are not limited to, a processing unit 620, a system memory 630, and a system bus 621 that couples various system components including the system memory to the processing unit 620. The system bus 621 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 610 typically includes a variety of computer readable media. Computer readable media can be any available media that can be accessed by computer 610 and includes both volatile and non-volatile media, removable and non-removable media. By way of example, and not limitation, computer readable media can comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or non-volatile memory such as ROM 631 and RAM 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 can also include other removable/non-removable, volatile/non-volatile computer storage media. By way of example only, FIG. 6 illustrates a hard disk drive 641 that reads from or writes to non-removable, non-volatile magnetic media, a magnetic disk drive 651 that reads from or writes to a removable, non-volatile magnetic disk 652, and an optical disk drive 655 that reads from or writes to a removable, non-volatile optical disk 656, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user can enter commands and information into the computer 610 through input devices such as a keyboard 662 and pointing device 661, commonly referred to as a mouse, trackball or touch pad. Other input devices (not shown) can include a microphone, joystick, game pad, satellite dish, scanner, or the like. These and other input devices are often connected to the processing unit 620 through a user input interface 660 that is coupled to the system bus, but can be connected by other interface and bus structures, such as a parallel port, game port or a universal serial bus (USB).

A monitor 691 or other type of display device is also connected to the system bus 621 via an interface, such as a video interface, which can comprise a graphics processing unit (GPU) and video memory 690. In addition to the monitor, computers can also include other peripheral output devices such as speakers 697 and printer 696, which can be connected through an output peripheral interface 695.

The computer 610 can operate in a networked environment using logical connections to one or more remote computers, such as a remote computer 680. The remote computer 680 can be a personal computer, a server, a router, a network PC, a peer device or other common network node, and typically includes many or all of the elements described above relative to the computer 610, although only a memory storage device 681 has been illustrated in FIG. 6. The logical connections depicted include a LAN 671 and a WAN 673, but can also include other networks. Such networking environments are commonplace in offices, enterprise-wide computer networks, intranets and the internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the internet. The modem 672, which can be internal or external, can be connected to the system bus 621 via the user input interface 660, or other appropriate mechanism. In a networked environment, program modules depicted relative to the computer 610, or portions thereof, can be stored in the remote memory storage device. By way of example, and not limitation, FIG. 6 illustrates remote application programs 685 as residing on memory device 681. It will be appreciated that the network connections shown are exemplary and other means of establishing a communications link between the computers can be used.

As mentioned above, while exemplary embodiments of the present invention have been described in connection with various computing devices, the underlying concepts can be applied to any computing device or system in which it is desired to provide control information to an application.

The various techniques described herein can be implemented in connection with hardware or software or, where appropriate, with a combination of both. Thus, the methods and apparatus of the present invention, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the present invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus of the present invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the present invention. When implemented on a general-purpose processor, the program code combines with the processor to provide a unique apparatus that operates to invoke the functionality of the present invention. Additionally, any storage techniques used in connection with the present invention can invariably be a combination of hardware and software.

The embodiment of a system and method comprising a hand-held game device as described herein provides an improved user game experience over games not possessing the herein described capabilities. Also, the game is capable of leaving a more favorable impression with the user. By rotating the hand-held device to different direction, and displaying the corresponding view in the game world, on the screen, the user can regard the small screen as a window to the virtual world. Instead of a small screen experience, the feeling that the game world is actually engulfing the gamer is generated: As the user rotates around, she can see different parts of the game world. For example, threats and challenges in the game can come from different directions, requiring the user to turn around to see the incoming threats and challenges. An improved user interface is also provided by allowing user orientation to control the viewing aspect of the application (e.g., first or third person aspect). Further, viewing and motions aspects of the application can be controlled by natural movements and/or gestures by the user. These types of movements are intuitive, thus requiring a short learning curve. Also, because the optical sensing device (e.g., camera) that comes with the hand-held device is being used, no special control devices are required.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for providing control information to an application, said method comprising:
   providing a mobile device comprising an optical sensor;
   sensing at least one feature via said optical sensor;
   determining a relative motion of said mobile device with respect to said at least one sensed feature;
   translating said determined relative motion into application control information, wherein the application control information is one of proxy and adjunct control information and wherein the relative motion is variably determined so that the same motion is determined differently to be proxy and adjunct control information; and
   providing said application control information to said application.

2. A method in accordance with claim 1, further comprising at least one of:
   rendering a display on said mobile device in accordance with said control information; and
   providing an audible indication in accordance with said control information.

3. A method in accordance with claim 1, wherein said application is a non-game application 4. A method in accordance with claim 1, wherein:
   said mobile device comprises a display device; and
   said optical sensor comprises a camera.

5. A method in accordance claim 1, wherein said mobile device comprises one of a hand-held game console, a mobile telephone, a personal data assistant (PDA), a laptop processor, and a tablet personal computer.

6. A method in accordance with claim 1, wherein said control information is formatted in accordance with a predetermined control information format.

7. A method in accordance with claim 6, wherein said predetermined control information comprises at least one of joystick control information, mouse control information, thumbwheel control information, and keyboard control information.

8. A method in accordance with claim 1, wherein:
   said mobile device comprises a hand-held game console;
   said application comprises a game application;
   said determined relative motion is translated to control information for controlling an aspect of said game application, wherein relative motion is variably translated such that the same motion is translated differently depending on scenarios of the game application; and
   said aspect of said game application is rendered on a display of said mobile device.

9. A method in accordance with claim 3, wherein said non-game application comprises one of a spreadsheet application, a menu driven application, and a photo album application.

10. A method in accordance with claim 1, further comprising tracking said at least one feature.

11. A system for providing control information to an application, said system comprising:
   a display portion for rendering aspects of said application;
   an optical sensor coupled to a processor for:
      optically sensing at least one feature; and
      providing a signal indicative of said at least one optically sensed feature to said processor; and
   said processor coupled to said optical sensor and said display, for:
      receiving said signal from said optical sensor;
      processing said signal from said optical sensor for determining a relative motion of said optical sensor with respect to said at least one sensed feature; determining application control information in accordance with said determined relative motion, wherein the application control information is one of proxy and adjunct control information and wherein the relative motion is variably determined such that the same motion is determined differently to be proxy and adjunct control information; and
      providing a signal indicative of said application control information to said display for rendering aspects of said application, wherein rendering comprises switching a viewing perspective of the application based on said determined relative motion.

12. A system in accordance with claim 11, wherein said application is a non-game application.

13. A system in accordance with claim 11, wherein said system comprises one of a mobile device, a hand-held game console, a mobile telephone, a personal data assistant (PDA), a laptop processor, and a tablet personal computer.

14. A system in accordance with claim 11, wherein said control information is formatted in accordance with a predetermined control information format that is compatible with an existing control device.

15. A system in accordance with claim 11, wherein:
said system comprises a hand-held game console;
said optical sensor comprises camera integrated with said hand-held game console;
said application comprises a game application;
said determined relative motion is translated to control information for controlling an aspect of said game application by switching the viewing perspective of the game application between a first person perspective and a third person perspective; and
said aspect of said game application is at least one of:
rendered on a display of said hand-held game console; and
provided audibly from said hand-held game console.

16. A system in accordance with claim 11, wherein said processor tracks said at least one optically sensed feature.

17. A computer storage medium, wherein the computer storage medium is not a transitory signal, the computer storage medium comprising computer executable instructions of computer program code which when executed by a computer, cause the computer to perform acts for providing control information to an application, said program code comprising:
computer executable instructions for sensing at least one feature via an optical sensor;
computer executable instructions for processing said signal from said optical sensor to determine a relative motion of said optical sensor with respect to said at least one sensed feature;
computer executable instructions for providing control information to said application responsive to said determined relative motion, wherein the application control information is proxy and/or adjunct control information and wherein the relative motion is variably translated such that the same motion is translated differently into proxy and adjunct control information;
computer executable instructions for rendering a display on a mobile device in accordance with said control information; and
computer executable instructions for providing an audible indication in accordance with said control information.

18. A computer storage medium in accordance with claim 17, wherein said relative motion corresponds to a relative motion of said mobile device with respect to said at least one sensed feature.

19. A computer storage medium in accordance with claim 17, wherein:
said mobile device comprises a hand-held game console;
said application comprises a game application;
said determined relative motion is translated to control information for controlling an aspect of said game application, wherein relative motion is variably translated depending on scenarios of the game application; and
said aspect of said game application is rendered on a display of said hand-held game console.

20. A computer storage medium in accordance with claim 17, wherein said control information is formatted in accordance with a predetermined control information format that is compatible with an existing control device.

* * * * *